United States Patent
Liu et al.

(10) Patent No.: US 12,079,108 B2
(45) Date of Patent: Sep. 3, 2024

(54) MACHINE LEARNING BASED ON FUNCTIONAL TESTING

(71) Applicant: MICRO FOCUS LLC, Santa Clara, CA (US)

(72) Inventors: Yun-Sheng Liu, Shanghai (CN); Peng-Ji Yin, Shanghai (CN); Er-Xin Shang, Shanghai (CN); Gil Nakache, Yehud (IL); Tsachi Ben Zur, Yehud (IL); Anton Kaminsky, Yehud (IL); Shuhui Fu, Shanghai (CN); Amos Nesher, Yehud (IL); Eyal Luzon, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 193 days.

(21) Appl. No.: 17/461,301

(22) Filed: Aug. 30, 2021

(65) Prior Publication Data
US 2023/0075004 A1 Mar. 9, 2023

(51) Int. Cl.
*G06F 11/36* (2006.01)
*G06F 9/54* (2006.01)
*G06N 20/00* (2019.01)

(52) U.S. Cl.
CPC .......... *G06F 11/3664* (2013.01); *G06F 9/543* (2013.01); *G06N 20/00* (2019.01)

(58) Field of Classification Search
None
See application file for complete search history.

(56) References Cited

U.S. PATENT DOCUMENTS

| | | |
|---|---|---|
| 9,251,435 B2 | 2/2016 | Danko |
| 10,380,449 B2 | 8/2019 | Kogan et al. |
| 10,387,292 B2 | 8/2019 | Budurean et al. |
| 10,929,159 B2 | 2/2021 | Pallapolu et al. |
| 11,049,058 B2 * | 6/2021 | Aasoori ........... G06Q 10/06375 |
| 2018/0307591 A1 * | 10/2018 | Lin ..................... G06F 11/3672 |
| 2020/0272887 A1 * | 8/2020 | Li ........................... G06F 18/40 |
| 2021/0216903 A1 * | 7/2021 | Suryawanshi ........... G06N 5/04 |
| 2022/0413997 A1 * | 12/2022 | Shi ......................... G06N 20/00 |
| 2023/0007894 A1 * | 1/2023 | Bussa ....................... G06F 8/60 |

FOREIGN PATENT DOCUMENTS

| CN | 111124863 A | 5/2020 |
|---|---|---|
| CN | 112052186 A | 12/2020 |

OTHER PUBLICATIONS

Wang, et al; Textout-Detecting Text-Layout Bugs in Mobile Apps via Visualization-Oriented Learning; 30th International Symposium on Software Reliability Engineering; 2019 IEEE; 11 pages.

* cited by examiner

Primary Examiner — Ryan D. Coyer
(74) Attorney, Agent, or Firm — Sheridan Ross P.C.

(57) ABSTRACT

An image of a graphical user interface is captured. A process is started to record identification of a graphical object (e.g., a text field) in the image of the graphical user interface. Recording identification of the graphical object in the image of the graphical user interface is based on machine learning. An end to the process to record identification of the graphical object in the image of the graphical user interface is identified. A machine learned software object is updated. For example, the machine learned software object is updated with a location of the graphical object. The updated machine learned software object then is used to test the graphical object. For example, to automatically fill in the text field using a test script.

20 Claims, 4 Drawing Sheets

MACHINE LEARNING BASED ON FUNCTIONAL TESTING

FIELD

The disclosure relates generally to automated testing of applications and particularly to automated testing of applications using machine learning.

BACKGROUND

Machine learning based functional testing is currently used to identify objects in a user interface. However, current uses of machine learning has performance problems when capturing an image of the application under test.

SUMMARY

These and other needs are addressed by the various embodiments and configurations of the present disclosure. The present disclosure can provide a number of advantages depending on the particular configuration. These and other advantages will be apparent from the disclosure contained herein.

An image of a graphical user interface is captured. A process is started to record identification of a graphical object (e.g., a text field) in the image of the graphical user interface. Recording identification of the graphical object in the image of the graphical user interface is based on machine learning. An end to the process to record identification of the graphical object in the image of the graphical user interface is identified. A machine learned software object is updated. For example, the machine learned software object is updated with a location of the graphical object in the image of the graphical user interface. The updated machine learned software object then is used to test the graphical object. For example, to automatically fill in the text field using a test script based on the location of the graphical object in the image of the graphical user interface.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
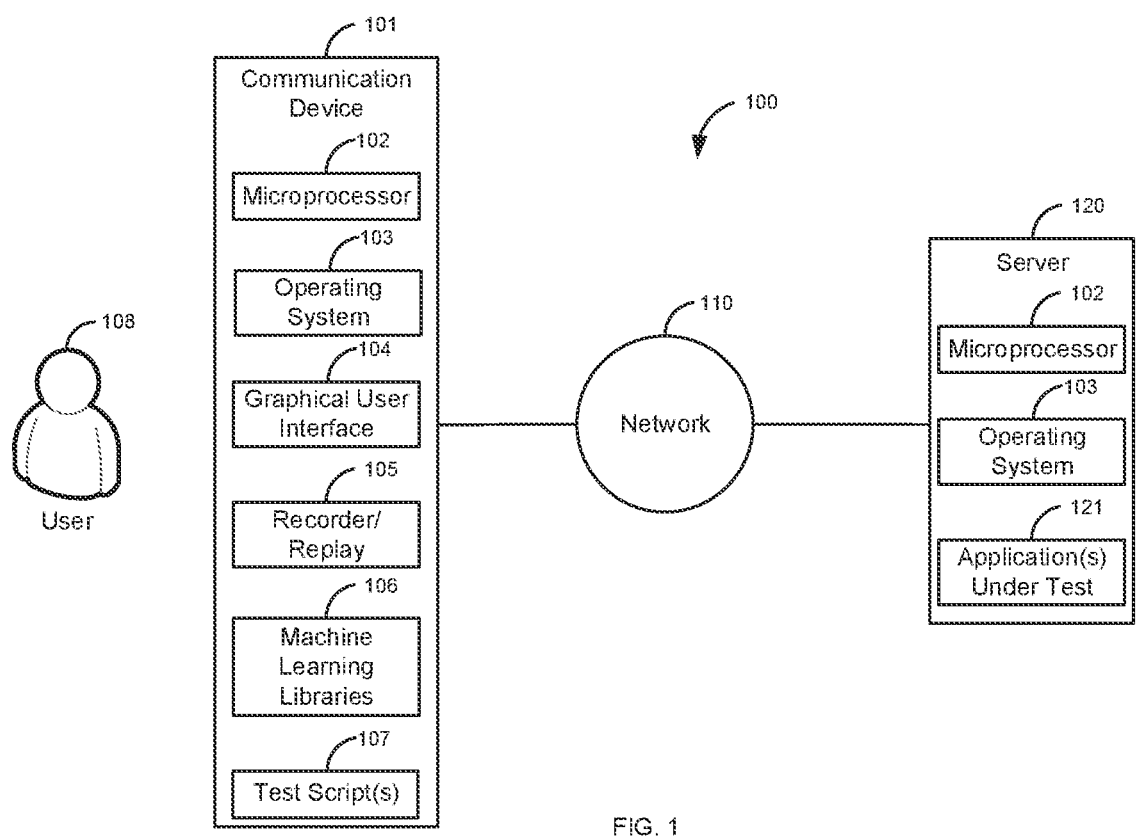
FIG. 1 is a block diagram of a first illustrative system for improved machine learning based functional testing of a graphical user interface.

FIG. 1 is a block diagram of a first illustrative system 100 for improved machine learning based functional testing of a graphical user interface 104. The first illustrative system 100 comprises a communication device 101, a network 110, and a server 120.

The communication device 101 can be or may include any device that can communicate on the network 110, such as a Personal Computer (PC), a mobile device, a cellular telephone, a Personal Digital Assistant (PDA), a tablet device, a notebook device, a smartphone, a server 120, and/or the like. Although FIG. 1 only shows a single communication device 101, any number of communication devices 101 may be connected to the network 110 and any number of communication devices 101 may connect to the server 120 via the network 110.

The communication device 101 comprises a microprocessor 102, an operating system 103, a graphical user interface, 104, a recorder/replay 105, machine learning libraries 106, and a test script(s) 107. The microprocessor 102 can be or may include any type of hardware microprocessor, such as, a multi-core processor, a microcontroller, an application specific processor, a reduced instruction set microprocessor, and/or the like. The microprocessor 102 runs the operating system 103.

The operating system 103 can be or any include any type of operating system, such as, a Linux™ operating system, a Windows™ operating system, an iOS™ operating system, an Android™ operating system, a multi-tasking operating system, a single tasking operating system, an embedded operating system, and/or the like. The operating system 103 is used to execute the recorder/replay 105, the machine learning libraries 106, and the test script(s) 107.

The graphical user interface 104 is a display of different types of graphical objects, such as, windows, text fields, text areas, text objects, menus, menu items, panes, panels, icons, buttons, images, videos, scroll bars, and/or the like. The graphical user interface 104 is generated by the operating system 103. Different types of graphical user interfaces 104 may be generated based on different contexts of the application under test 121. For example, the graphical user interface 104 may be different for each web page provided by the application under test 121.

The recorder/replay 105 is used to capture images of the graphical user interface 104. The recorder/replay 105 may capture multiple images of the graphical user interface 104. The recording may be done continually (a video) or based on individual images. For each captured image (e.g., web pages displayed by the application under test 121), the recorder/replay 105 may be used to store information about machine learned graphical objects, such as, where the graphical objects are located in the captured image.

The machine learning libraries 106 are a series of Application Programming Interface (API) library calls that use a machine learning process to identify graphical objects. For example, the machine learning libraries 106 may be called to identify the location of text fields, menus, menu items, buttons, icons, tabs, panels, scroll bars, sliders, images, and/or the like. The machine learning libraries 106 may use different types of machine learning, such as, supervised machine learning, unsupervised machine learning, reinforcement learning, semi-supervised machine learning, self-supervised machine learning, multi-instance learning, inductive learning, deductive inference learning, transductive learning, multi-task learning, active learning, online learning, transfer learning, ensemble learning, and/or the like. The machine learning libraries 106 are recorded based on specific code statements placed in the test scripts 107. The machine learning libraries 106 may be distributed between the server 120 and the communication device 101. Alternatively, the machine learning libraries 106 may reside on the server 120. For example, the code that contains the machine learning libraries 106 may be provided in a web page or from a cloud service.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The server 120 can be or may include any type of server 120, such as, a web server, an application server, an email server, a proxy server, a test server, a communication server, a database server, and/or the like. The server 120 may be a communication device 101 in a peer-to-peer environment. The server 120 further comprises a microprocessor 102, an operating system 103, and an application under test 121.

The microprocessor 102 on the server 120 may be the same or different from the microprocessor 102 on the communication device 101. For example, the microprocessor 102 on the communication device 101 may be a single core microprocessor 102 and the microprocessor 102 on the server 120 may be a multi-core microprocessor 102. Likewise, the operating system 103 on the communication device 101 may be the same or different from the operating system on the server 120. For example, the operating system 103 on the communication device 101 may be a Windows™ operating system 103 and the operating system 103 on the server 120 may be a Linux™ operating system 103.

The application(s) under test 121 can be or may include any type of application, such as, a web application, a security application, a word processor, a spreadsheet, a graphical design application, a communication application, an email application, and/or the like. The application(s) under test 121 may include multiple applications under test 121. The application(s) under test 121 are used to help generate the graphical user interface 104 that is displayed on the communication device 101. In one embodiment the application(s) under test 121 may reside on the communication device 101. In this embodiment, the server 120 may not be used.

Figure 2:
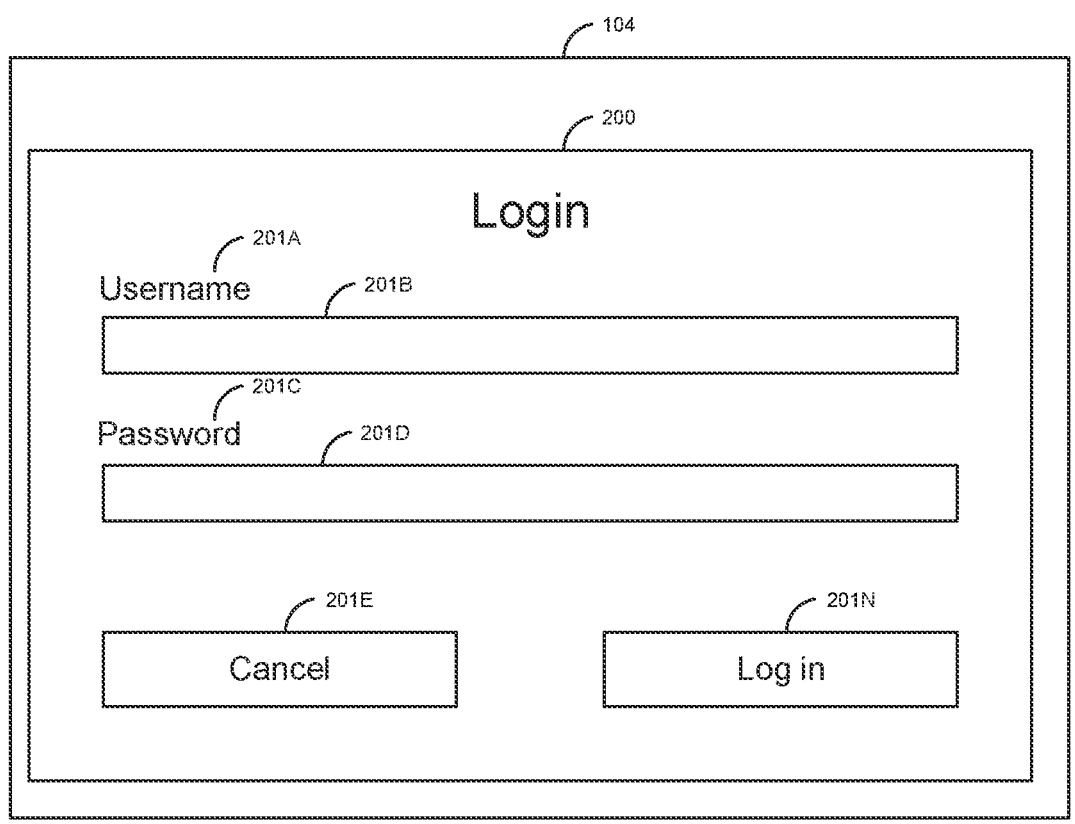
FIG. 2 is a diagram of an exemplary graphical user interface.

FIG. 2 is a diagram of an exemplary graphical user interface 104. The graphical user interface 104 comprises a login window 200. In this example, the login window 200 is provided by application under test 121.

The login window 200 comprises graphical objects 201A-201N. The graphical object 201A is a text object that has the text "Username". The graphical object 201B is a text field that allows the user 108 to enter the username. The graphical object 201C is a text object that has the text "Password". The graphical object 201D is a text field that allows the user to enter the password. The graphical object 201E is a button object that allows the user 108 to cancel the login process. The graphical object 201N is a button object that allows the user 108 to initiate the login process to the application under test 121.

The recorder/replay 105 is used to capture an image of the login window 200 in the graphical use interface 104. Using the machine learning libraries 106, the test script 107 can be used to exercise the login window 200. For example, the following machine learning library 106 calls (Code Snippet One) may be used to exercise the login window in the test script 107.

AIUtil("text_box", "Username").Type "testuser"
    AIUtil("text_box", "Password").Type "testuser123*"
    AIUtil("button", "Login").Click
        (Code Snippet One)

The machine learning library 106 call AIUtil("text_box", "Username").Type "testuser" uses the machine learning process to identify the location of the graphical object 201B (a text field) and then enter the text "testuser" into the graphical object 201B. The machine learning library 106 call AIUtil("text_box", "Password").Type "testuser123*" uses the machine learning process to identify the location of the graphical object 201D (a text field) and then enter the text "testuser123*" into graphical object 201D. The machine learning library 106 call AIUtil("button", "Login").Click identifies the location of the graphical object 201N (the login button) and then simulates a click on the login button 201N. The end result is that the login window is now tested by the test script 107.

One problem with repeating this process each time in the test script 107 is repeated is that the machine learning process is typically much slower in relation to entering the text (e.g., into the graphical objects 201B/201D) and clicking on the login button 201N. For example, the machine learning process may take one to two seconds for each call. This can make the time to test the application under test 121 take a very large amount of time if the test script 107 is long. In addition, doing a screen shot for each of the graphical user interfaces 104 may take a long period of time, especially if the communication device 101 is a smartphone.

One way to dramatically improve the testing time is to record the information learned through machine learning library 106 calls. For example, as shown below in Code Snippet Two, the same machine learning library 106 calls are recorded.

AIUtil.BeginSceneBlock
        AIUtil("text_box", "Username").Type "testuser"
        AIUtil("text_box", "Password").Type "testuser123*"
        AIUtil("button", "Log in").Click
    AIUtil.EndSceneBlock
        (Code Snippet Two)

The machine learning library 106 calls AIUtil.BeginSceneBlock and AIUtil.EndSceneBlock capture the machine learned information in a machine learned software object for the three machine learning library 106 calls AIUtil("text_box", "Username").Type "testuser", AIUtil("text_box", "Password").Type "testuser123*", and AIUtil("button", "Login").Click. In this example, the machine learned software object will have a structure for each of the three graphical objects 201B, 201D, and 201N (the Username text box, the Password text box, and the log in button). For example, the machine learned software object will have individual structures that have individual location information for each of the three graphical objects 201B, 201D, and 201N. This information can then be used to directly identify the locations of the software objects 201B, 201D, and 201N without having to reuse the machine learning library 106 calls. For example, instead of using machine learning each time, the test script 107 can now directly enter the text "testuser" and "testuser123*" into the graphical objects 201B and 201D when the test script 107 is executed a second time. This dramatically reduces the testing time when the test scripts 107 are rerun.

The process of Code Snippet Two may be repeated to generated different machine learned recordings. In addition to the recording of Code Snippet Two, this process may be repeated for additional tests steps in the test script 107. For example, a recording may be done based on a second image provided by the application under test 121 (e.g., adding an item to a shopping card).

Figure 3:
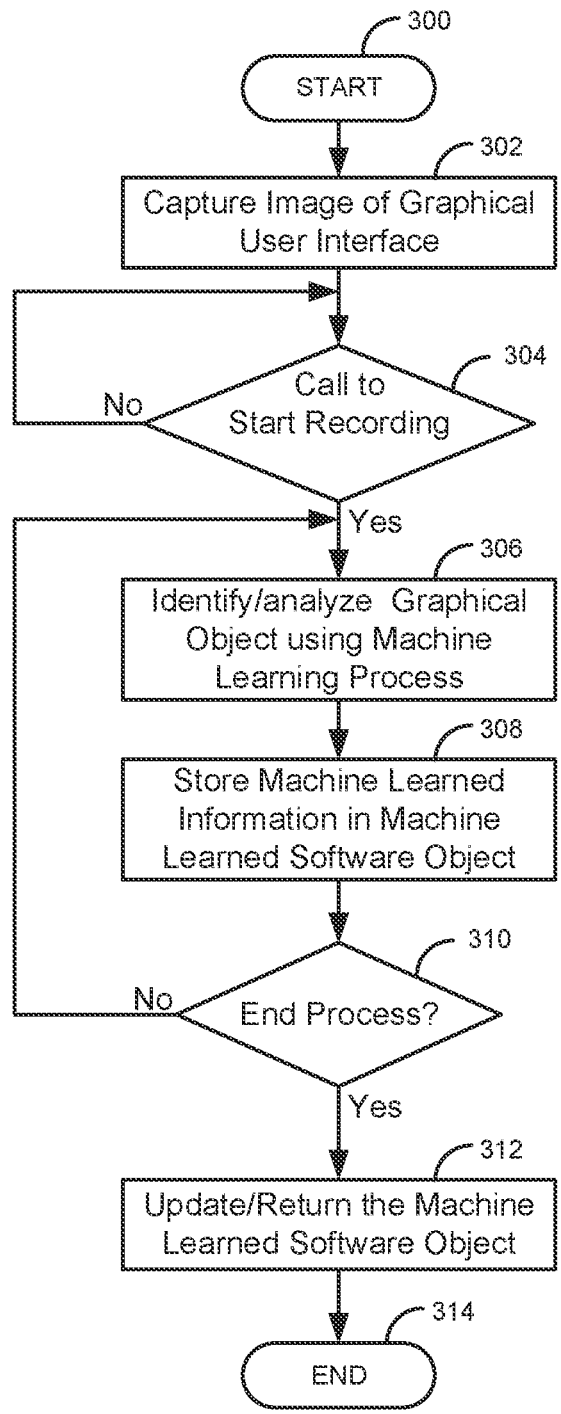
FIG. 3 is a flow diagram of a process for recording identification of graphical objects using machine learning.
Figure 4:
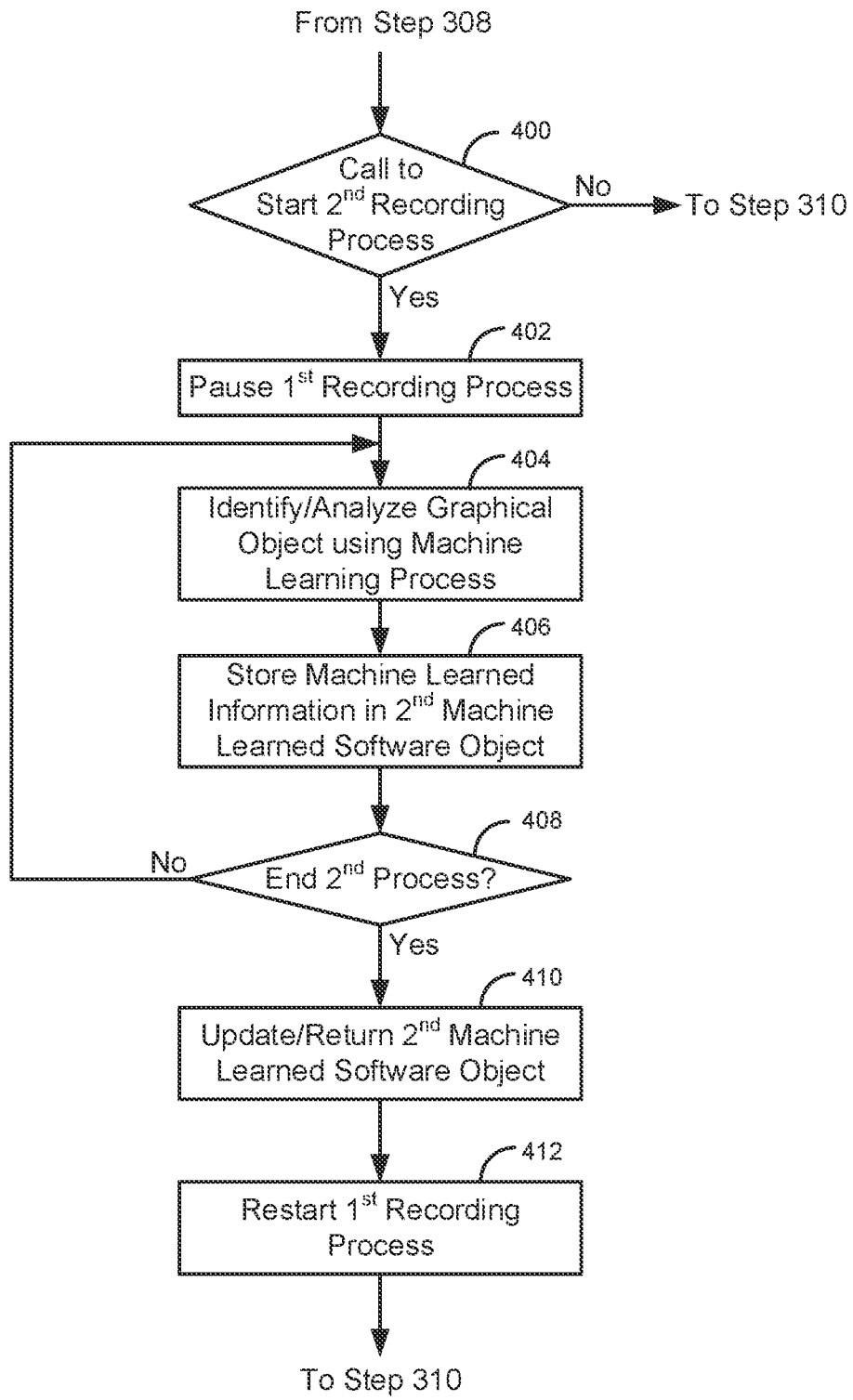
FIG. 4 is a flow diagram of a process for recording and identification of graphical objects using machine learning.

FIG. 3 is a flow diagram of a process for recording identification of graphical objects 201 using machine learning. Illustratively, the communication device 101, the operating system 103, the graphical user interface 104, the recorder/replay 105, the machine learning libraries 106, the network 110, the server 120, the application(s) under test 121 are stored-program-controlled entities, such as a computer or microprocessor 102, which performs the method of FIGS. 3-4 and the processes described herein by executing program instructions stored in a computer readable storage medium, such as a memory (i.e., a computer memory, a hard disk, and/or the like). Although the methods described in FIGS. 3-4 are shown in a specific order, one of skill in the art would recognize that the steps in FIGS. 3-4 and the processes described herein may be implemented in different orders and/or be implemented in a multi-threaded environment. Moreover, various steps may be omitted or added based on implementation.

In order to test the application(s) under test 121 a developer (e.g., the user 108) will create the test scripts 107. For example, the test script 107 as shown above in Code Snippet Two is created by the user 108.

The process starts in step 300. The recorder/replay 105 captures an image of the graphical user interface 104 in step 302. For example, the login window 200 is captured in the graphical user interface 104 in step 302. The recorder/replay 105 determines, in step 304, if there is a call to start recording. For example, as shown above in Code Snippet Two, a call to the machine learning library 106 call AIUtil.BeginSceneBlock is made. If the call to start recording is not made in step 304, the process of step 304 repeats.

Otherwise, if the call to start recording in step 304 is made, the machine learning process identifies/analyzes, in step 306, the graphical object(s) 201 in the graphical user interface 104 using the machine learning process. The recorder/replay 105 stores, in step 308, the machine learned information into a machine learned software object. The machine learned software object may comprise various types of information about the each graphical object 201. For example, an exemplary machine learned software object is shown below for the graphical object 201B (the username text field).

```
{
    "associated_controls": [{
        "associated_uid": "5",
        "association_type": "associated_text",
        "role": "name"
    }, {
        "associated_uid": "6",
        "association_type": "associated_text",
        "role": "adjacent"
    }
    ],
    "confidence": {
       "details": {
          "control_confidence": 82.759,
          "match_confidence": 100,
          "text_ai_confidence": 100,
          "text_confidence": 100
       },
       "overall": 87.069
    },
    "control_class": "text_box",
    "properties": {
       "adjacent": "Password",
       "name": "Username",
       "value": ""
    },
    "region": {
       "height": 36,
       "width": 351,
       "x": 70,
       "y": 155
    },
    "text": "Username",
    "uid": "1"
}
```

As can be seen, the machine learned software object for the graphical object 201B contains various information, such as, an object type (text_box), a machine learning control confidence score ("overall": 87.069), a machine learning match confidence score (text_ai_confidence": 100), a text machine learning confidence score (text_ai_confidence": 100), a text confidence score ("text confidence": 100), an overall machine learning confidence score ("overall": 87.069, a set of region coordinates in the graphical user interface 104 ("height": 36, "width": 351, "x": 70, "y": 155), along with other information. The graphical object 201D will have a similar structure because both graphical objects 201B and 201D are text fields.

The information stored in the machine learned software object provides various types of information that has been learned about the graphical object 201. For example, the information may be used to determine the graphical object's location is accurate, the location of the graphical object 210, adjacent graphical objects 201, and/or the like.

The information stored in the machine learned software object may change based on the type of software object that was identified. For example, for the graphical object 201N (the Log in button), the following machine learned software object may be created.

```
{
    "confidence": {
       "details": {
          "match_confidence": 100,
          "text_confidence": 100,
          "text_distance_confidence": 100
       },
       "overall": 100
    },
    "control_class": "text_block",
    "region": {
       "height": 11,
       "width": 49,
       "x": 311,
       "y": 380
    },
    "selector": {
       "position": "fromBottom"
    },
    "text": "Login",
    "uid": "10",
    "words": [{
       "confidence": 100,
       "index": 8,
       "rectangle": {
          "height": 11,
          "width": 30,
          "x": 311,
          "y": 380
       },
       "text": "Log"
    }, {
       "confidence": 100,
       "index": 9,
       "rectangle": {
          "height": 11,
          "width": 13,
          "x": 347,
          "y": 380
       },
       "text": "in"
    }
    ]
}
```

Like for the graphical object 201B, the machine learned software object has many of the same types of information, such as, the machine learning match confidence score. However, the machine learned software object may have different information, such as a text distance confidence score ("text_distance_confidence": 100), and a selector position. The information contained in the machine learned software object can then be used to preform different tests on the different graphical objects 201 by executing the test script 107.

The recorder/replay 105 determines if the recording process ends in step 310. For example, if the AIUtil.EndSceneBlock machine learning library 106 call is made. If the process does not end in step 310, the process goes back to step 306 to identify/analyze the next graphical object 201. Otherwise, if the recording process ends in step 310, the recorder/replay 105 update/returns the machine learned software object in step 312. The recording process then ends in step 314.

FIG. 4 is a flow diagram of a process for recording and identification of graphical objects 201 using machine learning. The process of FIG. 4 goes between step 308 and step 310 of FIG. 3. The process of FIG. 4 is for where there are nested BeginSceneBlock and EndSceneBlock machine learning library 106 calls. For example, Code Snippet Three below shows an example of a nested process (an in-line coding structure) for recording and identifying graphical objects 201.

BeginSceneBlock
    Machine Learning Library call AA
    Machine Learning Library call AB
    BeginSceneBlock
        Machine Learning Library call BA
        Machine Learning Library call BB
    EndSceneBlock
    Machine Learning Library call AC
EndSceneBlock (Code Snippet Three)

The same nested process may be implemented where the machine learned software object is passed as a parameter (e.g., blockA/blockB) as shown below in Code Snippet Four. Code Snippet Four is also an in-line coding structure.

```
blockA=CaptureSceneBlock
   withSceneBlock(blockA).AA
   withSceneBlock(blockA).AB
   blockB=CaptureSceneBlock
      withSceneBlock(blockB) . . . BA
      withSceneBlock(blockB) . . . BB
   blockB.release
   withSceneBlock(blockA) . . . AC
   withSceneBlock(blockA) . . . AD
blockA.release
```

(Code Snippet Four)

Alternatively, the nested process may utilize a function call when recording and identifying the graphical objects 201. For example, as shown below in Code Snippet Five, the use of a function call is used when starting the recording/identification of graphical objects 201.

```
using (CaptureSceneBlock( yy){
   Machine Learning Library call AA
   Machine Learning Library call AB
   using(CaptureSceneBlock( )){
   Machine Learning Library call BA
   Machine Learning Library call BB
   }
   Machine Learning Library call AC
}
```

(Code Snippet Five)

Each of the nested processes may be implemented using the process described in FIG. 4. After storing the machine learned information for the machine learned software object in step 308, the recorder/replay 105, determines if a second call to a second recording process is received in step 400. For example, a second BeginSceneBlock call is made. If a second call to a second recording process is not made in step 400, the process goes to step 310.

Otherwise, if a second call to a second recording process is made in step 400, the first recording process is paused in step 402. The machine learning process identifies/analyzes, in step 404, the graphical objects 201 in the graphical user interface 104 using the machine learning process. The recorder/replay 105 stores, in step 406, the machine learned information into a second machine learned software object (similar to steps 306/308 of FIG. 3).

The recorder/replay 105 determines if the second recording process ends in step 408. For example, if the second AIUtil.EndSceneBlock machine learning library 106 call is made. If the second recording process is not to end in step 408, the process goes back to step 404. Otherwise, if the second recording process is to end in step 408, the recorder/replay 105 updates/returns the second machine learned software object in step 410. The recorder/replay 105 restarts the first recording process in step 412. The process then goes to step 310.

Although not shown the process of FIG. 4 could be adapted to support more than two nested recording processes. For example, the process of FIG. 4 could support any number of nested recording processes.

As would be obvious to one of skill in the art, all the processes described herein may be implemented using various programming methods and programming languages. For example, the processes could be implemented using program languages like Java, JavaScript, C, C++, and/or the like.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable medium, coupled with the microprocessor and comprising microprocessor readable and executable instructions that, when executed by the microprocessor, cause the microprocessor to:
   capture a first image of a graphical user interface;
   start a first process to record identification of a first graphical object in the first image of the graphical user interface, wherein recording identification of the first graphical object in the first image of the graphical user interface is based on machine learning;
   end the first process to record identification of the first graphical object in the first image of the graphical user interface; and update a first machine learned software object, wherein the update comprises a location of the first graphical object and wherein the updated first machine learned software object is used to test the first graphical object at the location of the first graphical object.

2. The system of claim 1, wherein the microprocessor readable and executable instructions further cause the microprocessor to:
   start a second process to record identification of a second graphical object in the first image of the graphical user interface, wherein starting the second process to record the second graphical object in the first image of the graphical user interface occurs after starting the first process to record the first graphical object in the first image of the graphical user interface; and
   end the second process to record the second graphical object in the first image of the graphical user interface, wherein ending the second process to record the second graphical object in the first image of the graphical user interface occurs before ending the first process to record the first graphical object in the first image of the graphical user interface.

3. The system of claim 2, wherein starting and ending the second process to record the second graphical object in the first image of the graphical user interface occurs in an in-line coding structure.

4. The system of claim 2, wherein the record identification of the first graphical object in the first image of the graphical user interface comprises a record identification of a plurality of graphical objects and wherein the microprocessor readable and executable instructions further cause the microprocessor to: prior to starting the second process to record identification of the second graphical object in the first image of the graphical user interface, pause the record identification of the plurality of graphical objects in the first image of the graphical user interface.

5. The system of claim 1, wherein starting the first process to record the first graphical object in the first image of the graphical user interface is based on a first Application Programming Interface (API) and wherein the first machine learned software object is passed as a parameter in the first API.

6. The system of claim 5, wherein the updated first machine learned software object comprises at least one of the following:
   an object type;
   a machine learning control confidence score;
   a machine learning match confidence score;
   a text machine learning confidence score;
   a text confidence score;
   an overall machine learning confidence score;
   a set of region coordinates in the graphical user interface;
   a text distance confidence score; and
   a selector position.

7. The system of claim 1, wherein the microprocessor readable and executable instructions further cause the microprocessor to:
   capture a second image of the graphical user interface;
   start a second process to record identification of a second graphical object in the second image of the graphical user interface, wherein recording identification of the second graphical object in the second image of the graphical user interface is based on machine learning;
   end the second process to record identification of the second graphical object in the second image of the graphical user interface; and
   update a second machine learned software object, wherein the update comprises a location of the second graphical object and wherein the updated second machine learned software object is used to test the second graphical object at the location of the second graphical object.

8. A non-transitory computer readable medium having stored thereon instructions that cause a processor to execute a method, the method comprising:
   instructions to:
      capture a first image of a graphical user interface;
      start a first process to record identification of a first graphical object in the first image of the graphical user interface, wherein recording identification of the first graphical object in the first image of the graphical user interface is based on machine learning;
      end the first process to record identification of the first graphical object in the first image of the graphical user interface; and
      update a first machine learned software object, wherein the update comprises a location of the first graphical object and wherein the updated first machine learned software object is used to test the first graphical object at the location of the first graphical object.

9. The non-transitory computer readable medium of claim 8, wherein the instructions further cause the processor to:
   start a second process to record identification of a second graphical object in the first image of the graphical user interface, wherein starting the second process to record the second graphical object in the first image of the graphical user interface occurs after starting the first process to record the first graphical object in the first image of the graphical user interface; and
   end the second process to record the second graphical object in the first image of the graphical user interface, wherein ending the second process to record the second graphical object in the first image of the graphical user interface occurs before ending the first process to record the first graphical object in the first image of the graphical user interface.

10. The non-transitory computer readable medium of claim 9, wherein starting and ending the second process to record the second graphical object in the first image of the graphical user interface occurs in an in-line coding structure.

11. The non-transitory computer readable medium of claim 9, wherein the record identification of the first graphical object in the first image of the graphical user interface comprises a record identification of a plurality of graphical objects and wherein the instructions further cause the microprocessor to: prior to starting the second process to record identification of the second graphical object in the first image of the graphical user interface, pause the record identification of the plurality of graphical objects in the first image of the graphical user interface.

12. The non-transitory computer readable medium of claim 8, wherein starting the first process to record the first graphical object in the first image of the graphical user interface is based on a first Application Programming Interface (API) and wherein the first machine learned software object is passed as a parameter in the first API.

13. The non-transitory computer readable medium of claim 12, wherein the updated first machine learned software object comprises at least one of the following:
   an object type;
   a machine learning control confidence score;
   a machine learning match confidence score;
   a text machine learning confidence score;
   a text confidence score;

an overall machine learning confidence score;
a set of region coordinates in the graphical user interface;
a text distance confidence score; and
a selector position.

14. The non-transitory computer readable medium of claim 8, wherein the instructions further cause the processor to:
capture a second image of a graphical user interface;
start a second process to record identification of a second graphical object in the second image of the graphical user interface, wherein recording identification of the second graphical object in the second image of the graphical user interface is based on machine learning;
end the second process to record identification of the second graphical object in the second image of the graphical user interface; and
update a second machine learned software object, wherein the update comprises a location of the second graphical object and wherein the updated second machine learned software object is used to test the second graphical object at the location of the first graphical object.

15. A method comprising:
capturing, by a microprocessor, a first image of a graphical user interface;
starting, by the microprocessor, a first process to record identification of a first graphical object in the first image of the graphical user interface, wherein recording identification of the first graphical object in the first image of the graphical user interface is based on machine learning;
ending, by the microprocessor, the first process to record identification of the first graphical object in the first image of the graphical user interface; and
in response to ending the first process to record identification of the first graphical object in the first image of the graphical user interface, updating, by the microprocessor, a first machine learned software object, wherein the updated first machine learned software object is used to test the first graphical object.

16. The method of claim 15, further comprising:
starting a second process to record identification of a second graphical object in the first image of the graphical user interface, wherein starting the second process to record the second graphical object in the first image of the graphical user interface occurs after starting the first process to record the first graphical object in the first image of the graphical user interface; and
ending the second process to record the second graphical object in the first image of the graphical user interface, wherein ending the second process to record the second graphical object in the first image of the graphical user interface occurs before ending the first process to record the first graphical object in the first image of the graphical user interface.

17. The method of claim 16, wherein the record identification of the first graphical object in the first image of the graphical user interface comprises a record identification of a plurality of graphical objects and further comprising: prior to starting the second process to record identification of the second graphical object in the first image of the graphical user interface, pausing the record identification of the plurality of graphical objects in the first image of the graphical user interface.

18. The method of claim 15, wherein starting the first process to record the first graphical object in the first image of the graphical user interface is based on a first Application Programming Interface (API) and wherein the first machine learned software object is passed as a parameter in the first API.

19. The method of claim 18, wherein the updated first machine learned software object comprises at least one of the following:
an object type;
a machine learning control confidence score;
a machine learning match confidence score;
a text machine learning confidence score;
a text confidence score;
an overall machine learning confidence score;
a set of region coordinates in the graphical user interface;
a text distance confidence score; and
a selector position.

20. The method of claim 15, further comprising:
capturing, by the microprocessor, a second image of a graphical user interface;
starting, by the microprocessor, a second process to record identification of a second graphical object in the second image of the graphical user interface, wherein recording identification of the second graphical object in the second image of the graphical user interface is based on machine learning;
ending, by the microprocessor, the second process to record identification of the second graphical object in the second image of the graphical user interface; and
updating, by the microprocessor, a second machine learned software object, wherein the update comprises a location of the second graphical object and wherein the updated second machine learned software object is used to test the second graphical object at the location of the second graphical object.

* * * * *